(12) United States Patent
Schenk et al.

(10) Patent No.: US 9,937,562 B2
(45) Date of Patent: Apr. 10, 2018

(54) DRILL CHUCK

(71) Applicants: Peter Schenk, Niederstotzingen (DE); Christian Thiemann, Muensingen (DE)

(72) Inventors: Peter Schenk, Niederstotzingen (DE); Christian Thiemann, Muensingen (DE)

(73) Assignee: ROEHM GMBH, Sontheim (DE)

( * ) Notice: Subject to any disclaimer, the term of this patent is extended or adjusted under 35 U.S.C. 154(b) by 558 days.

(21) Appl. No.: 14/208,750

(22) Filed: Mar. 13, 2014

(65) Prior Publication Data

US 2014/0284888 A1 Sep. 25, 2014

(30) Foreign Application Priority Data

Mar. 25, 2013 (DE) .................... 20 2013 101 255 U

(51) Int. Cl.
*B23B 31/12* (2006.01)
*B23B 31/00* (2006.01)

(52) U.S. Cl.
CPC ........ *B23B 31/001* (2013.01); *B23B 31/1238* (2013.01); *B23B 2231/28* (2013.01); *B23B 2231/38* (2013.01); *B23B 2270/30* (2013.01); *Y10T 279/17623* (2015.01); *Y10T 279/17632* (2015.01); *Y10T 279/3493* (2015.01)

(58) Field of Classification Search
CPC .............. B23B 31/1238; B23B 31/001; B23B 2231/28; B23B 2231/38; B23B 2270/30; B23B 31/1215; B23B 2231/34; Y10T 279/17632; Y10T 279/3493; Y10T 279/17615; Y10T 279/17623
See application file for complete search history.

(56) References Cited

U.S. PATENT DOCUMENTS

| 3,712,632 | A | * | 1/1973 | Wightman | .......... B23B 31/1238 |
| | | | | | 279/133 |
| 3,727,931 | A | * | 4/1973 | Wightman | .......... B23B 31/1238 |
| | | | | | 279/158 |
| 4,627,628 | A | * | 12/1986 | Rohm | .................... B23B 31/123 |
| | | | | | 279/140 |

(Continued)

FOREIGN PATENT DOCUMENTS

| EP | 0331866 A2 * | 9/1989 | ......... B23B 31/1238 |
| EP | 1170078 A1 * | 1/2002 | ........... B23B 31/123 |

(Continued)

*Primary Examiner* — Eric A Gates
(74) *Attorney, Agent, or Firm* — Andrew Wilford

(57) ABSTRACT

A drill chuck has a chuck body having a plurality of angularly spaced and axially extending but angled guide grooves each holding a jaw that is axially displaceable between an axially front closed position and an axially rear open position. Each jaw has an outer edge formed with external teeth, and also has an axially rearwardly directed rear face extending at an acute angle to a plane perpendicular to the axis. A ring rotatable on the body about the axis has an internal screwthread meshing with the teeth, and an adjustment sleeve rotationally coupled to the ring is rotatable to move the jaws between the open and closed positions. A cover disk on the rear end of the body is formed with respective throughgoing chip-discharge holes each having an inner end aligned with a respective one of the grooves and an outwardly open outer end.

11 Claims, 3 Drawing Sheets

(56) References Cited

U.S. PATENT DOCUMENTS

| | | | | |
|---|---|---|---|---|
| 5,286,041 A | * | 2/1994 | Rohm | B23B 31/1215 279/140 |
| 5,882,153 A | * | 3/1999 | Mack | B23B 31/008 173/48 |
| 5,918,887 A | * | 7/1999 | Miles | B23B 31/1238 279/123 |
| 6,045,141 A | * | 4/2000 | Miles | B23B 31/1238 279/60 |
| 6,129,363 A | * | 10/2000 | Mack | B23B 31/1215 279/158 |
| 6,502,836 B1 | * | 1/2003 | Marriott | B23B 31/001 279/140 |
| 6,540,237 B1 | * | 4/2003 | Temple-Wilson | B23B 31/1238 279/62 |
| 6,550,785 B2 | * | 4/2003 | Rohm | B23B 31/123 279/140 |
| 6,575,478 B2 | * | 6/2003 | Rohm | B23B 31/1238 279/62 |
| 6,595,527 B2 | * | 7/2003 | Mack | B23B 31/001 279/157 |
| 6,851,678 B2 | * | 2/2005 | Mack | B23B 31/06 279/137 |
| 6,860,488 B2 | * | 3/2005 | Mack | B23B 31/1238 279/125 |
| 7,389,993 B2 | * | 6/2008 | Rohm | B23B 31/123 279/140 |
| 8,215,649 B2 | * | 7/2012 | Mack | B23B 31/123 279/125 |
| 8,740,227 B2 | * | 6/2014 | Zhou | B23B 31/123 279/140 |
| 2002/0000698 A1 | | 1/2002 | Rohm | |
| 2003/0167123 A1 | | 9/2003 | Nakazawa et al. | |
| 2003/0230861 A1 | | 12/2003 | Rohm | |
| 2004/0227309 A1 | | 11/2004 | Rohm | |
| 2008/0067761 A1 | | 3/2008 | Mack | |
| 2013/0277923 A1 | * | 10/2013 | Campbell | B23B 31/123 279/126 |
| 2014/0167368 A1 | * | 6/2014 | Schenk | B23B 31/1238 279/61 |
| 2015/0115550 A1 | * | 4/2015 | Schenk | B23B 31/123 279/60 |

FOREIGN PATENT DOCUMENTS

| | | | | |
|---|---|---|---|---|
| EP | 1302266 A1 | * | 4/2003 | ......... B23B 31/1207 |
| WO | WO 2007038906 A1 | * | 4/2007 | ........... B23B 31/123 |

* cited by examiner ary reduced

DRILL CHUCK

FIELD OF THE INVENTION

The invention relates to a drill chuck.

BACKGROUND OF THE INVENTION

A standard drill chuck has a chuck body having at its rear end a drive-spindle seat and in which jaws having gripping faces are movable in guide grooves extending at an acute angle to the chuck axis. The jaws engage by external teeth an internal screwthread of a threaded ring rotatable on the chuck body in order to move between an open position and a closed position, and an adjustment sleeve surrounding the chuck body is provided to actuate the threaded ring, and a cover disk at the rear end is formed with chip-discharge holes.

A problem encountered with drill chucks is that drill chips can penetrate into the housing—especially during overhead work—with the result that the action of drilling or adjusting the jaws can be impeded or the service life of the drilling machine can be reduced due to particles or drill chips inside the drill chuck that have an abrasive effect and increase wear.

In order to prevent this problem and extend the service life of the drill chuck in drill chucks of the above-referenced type, such as those disclosed for example in U.S. Pat. No. 6,581,942, the particles that have already penetrated into the drill chuck can be forced out through chip-discharge holes in the cover disk. In the drill chucks known in the art, however, this occurs unpredictably or randomly, and thus not effectively.

OBJECTS OF THE INVENTION

It is therefore an object of the invention to provide an improved drill chuck.

Another object is the provision of such an improved drill chuck that overcomes the above-given disadvantages, in particular that avoids the above-described disadvantages.

SUMMARY OF THE INVENTION

A drill chuck has according to the invention a chuck body extending along an axis and having a rear end formed with a drive-spindle seat and a plurality of angularly spaced and axially extending but angled guide grooves. Respective jaws are axially displaceable in the grooves between an axially front and radially closely spaced closed position and an axially rear and radially less closely spaced open position. Each jaw has an inner edge adapted to grip a tool and an outer edge formed with external teeth, and also has an axially rearwardly directed rear face extending at an acute angle to a plane perpendicular to the axis and inclined axially forward from the outer edge toward the inner edge. A ring rotatable on the body about the axis has an internal screwthread meshing with the teeth, and an adjustment sleeve rotationally coupled to the ring is rotatable to move the jaws between the open and closed positions. A cover disk on the rear end of the body is formed with respective throughgoing chip-discharge holes each having an inner end aligned with a respective one of the grooves and an outwardly open outer end so that chips in the grooves are urged radially outward and axially rearward by centrifugal force during drilling and are pushed out through the holes in a fully open position of the jaws.

The angled orientation of the particle-conveying surfaces according to the invention ensures that the drill chips that have penetrated, for example, during overhead work into the drill chuck are carried radially outward by centrifugal force during drilling, and at the same time are urged toward the cover disk by the angled particle-conveying surfaces. Since the jaws are moved simultaneously toward the cover disk when the jaws are reset from the closed to the open position—thus in particular when the drill bit is changed—this action causes drill chips in the guide groove and drill chips that have been diverted radially outward by the centrifugal forces in effect during drilling to be effectively forced out through the chip-discharge holes by repositioning the jaws.

It has been found especially advantageous here if the particle-conveying surface is a planar surface. This enables the particles inside the drill chuck, in particular, to be conducted radially outward especially effectively during drilling. In addition, it is especially easy to manufacture a design of this type for the particle-conveying surface, and this has a positive effect on the production cost for each individual jaw and thus for the drill chuck according to the invention.

It has furthermore been found advantageous for the particle-conveying surface to be a curved surface. This curved surface whose radius of curvature can vary, enables a situation to be prevented where the guide surface of the jaws formed by the edge of the jaws opposite the external teeth, has to be excessively shortened, thereby allowing a relatively large guide length to be maintained in the guide grooves for the jaws, with the result that small tool diameters can also be securely clamped in place.

An approach is furthermore preferred whereby the planar surface or the chord connecting the vertices of the curved surface extend relative to a plane perpendicular to the chuck axis at an angle $\alpha$ ranging between 2° and 15°, and especially preferably, around 5°. This design involving angled particle-conveying surfaces, in particular, supports the radial diversion of the drill chips in the drill chuck during drilling. An angled orientation of this type furthermore has a positive effect on the length of the drill chuck according to the invention since selecting an appropriate angle $\alpha$ enables the axial length of the jaws in the guide grooves to be reduced relative to the chuck axis, with the result that the chuck body, and thus the entire drill chuck, can be made shorter. This enables a drill chuck to be created that is very compact.

An approach has also proven successful where one particle-conveying bump is provided on the rear end of each of the jaws toward the edge having the external teeth. This particle-conveying bump enables the drill chips that have been diverted radially outward by the centrifugal force provided during drilling to be forced out through the respective chip-discharge holes when the jaws are reset from the closed to the open position. It has also proven advantageous in this regard for the chip-discharge holes to extend radially or axially through the cover disk. This enables the drill chips that have penetrated into the drill chuck to be effectively conveyed out of the chuck. However, the invention also provides for the chip-discharge holes to extend at an acute angle within the cover disk.

It is furthermore advantageous according to the invention that the cover disk has a shape that matches the particle-conveying surfaces in the regions facing the rear ends of the jaws so as to create a particle-conveying passage. This type of particle-conveying passage supports the radial outward diversion of drill chips in the drill chuck, where the diameter of the particle-conveying passage changes as a function of the clamping diameter, and is preferably completely closed in the open position so as to prevent any repeat penetration of drill chips into the guide grooves.

It has also been found advantageous for the cover disk on the face opposite the drive-spindle seat to have guide surfaces that are oriented flush with the guide grooves in the region of the chip-discharge holes. This enables drill chips in the guide grooves to be conveyed especially effectively along the guide surfaces to the chip-discharge holes, and thus forced out of the drill chuck when the jaws are reset from the closed to the open position.

BRIEF DESCRIPTION OF THE DRAWING

The above and other objects, features, and advantages will become more readily apparent from the following description, reference being made to the accompanying drawing in which.

SPECIFIC DESCRIPTION OF THE INVENTION

Figure 1:
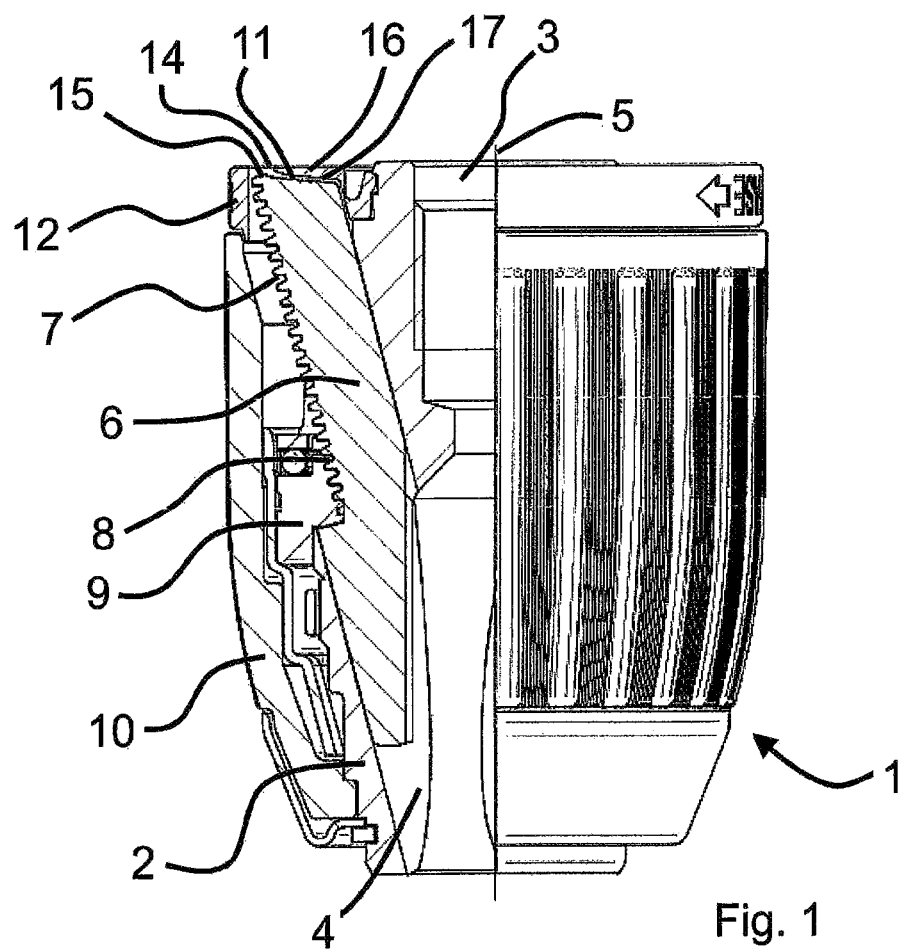
FIG. 1 is a partial section through a first embodiment of a drill chuck according to the invention.

As seen in FIG. 1, a drill chuck 1 according to the invention has a chuck body 2 with a drive-spindle seat 3 at its rear end. Jaws 6 are movably guided in the chuck body 2 in guide grooves 4 extending at an acute angle to the chuck axis 5. These jaws are engaged by external teeth 7 with an internal screwthread 8 of a threaded ring 9 rotatable on the chuck body 2. The threaded ring 9 is rotationally coupled to an adjustment sleeve 10 surrounding the chuck body 2. Thus rotation of the sleeve 10 about the axis 5 in a tightening direction rotates the ring 9 to move the jaws 6 axially forward and radially inward into a closed front position with the jaws 6 radially closely spaced and in an opposite loosening direction to move the jaws 6 axially rearward and radially outward into an open rear position with the jaws 6 radially more widely spaced.

Figure 7:
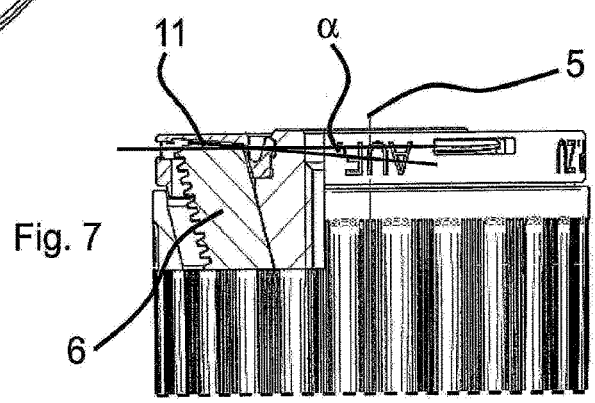
FIG. 7 is a schematic diagram illustrating the angle α.

The jaws 6 each have a rear face formed as a particle-conveying surface 11 extending at an acute angle from the teeth 7 forward and functioning by centrifugal force occurring during drilling to divert drill chips in the chuck 1 radially outward toward a cover disk 12 mounted on the rear end of the chuck body 2. Each particle-conveying surface 11 in this embodiment is curved and has a changing radius of curvature and a chord connecting the vertices of the curved rear face 11 relative to a plane perpendicular to the drill axis 5 has an angle α (see FIG. 7) of between 2° and 15°, here 5°.

As also shown in FIG. 1, the axial length of the jaws 6 is also shortened by the angled particle-conveying surface 11, thereby allowing the chuck body 2 to be made shorter and the length of the drill chuck 1 to be reduced. Chip-discharge holes 14 are formed in the cover disk 12 to effectively expel drill chips that have penetrated into the drill chuck 1. These chip-discharge holes 14 are positioned on the cover disk 12 so that they can each interact with a respective particle-conveying bump 15 on each of the jaws 6. This allows the drill chips in the drill chuck 1 to be effectively pushed out through the chip-discharge holes 14 when the jaws 6 are reset from the closed to the fully open position.

In the embodiment shown in FIG. 1, each chip-discharge hole 14 extends axially from its inner end to its outer end through the cover disk 12, with the inner end opening axially forwardly and the outer end opening axially rearwardly. In addition, the cover disk 12 has a formation 16 matching the particle-conveying surfaces 11 in regions facing the rear ends of the jaws 6, thereby creating a particle-conveying passage 17 in order to effectively divert drill chips in the drill chuck 1 radially outward from the drill chuck.

FIG. 1 shows a drill chuck comprising a radial locking means, such as that described in detail, for example, in U.S. Pat. No. 5,765,839 herewith incorporated by reference. This radial locking means has a locking element in the form of a spring clip that is operated by a control cam on the inside surface of the adjustment sleeve 10. In particular, drill chips deposited in the control cams, which are made of plastic, degrades the functionality of the radial locking means and increases wear; and therefore the invention provides special advantages for these high-quality drill chucks since it is specifically this wear that is reduced by the intrinsic cleaning function every time the drill chuck is opened.

Figure 2:
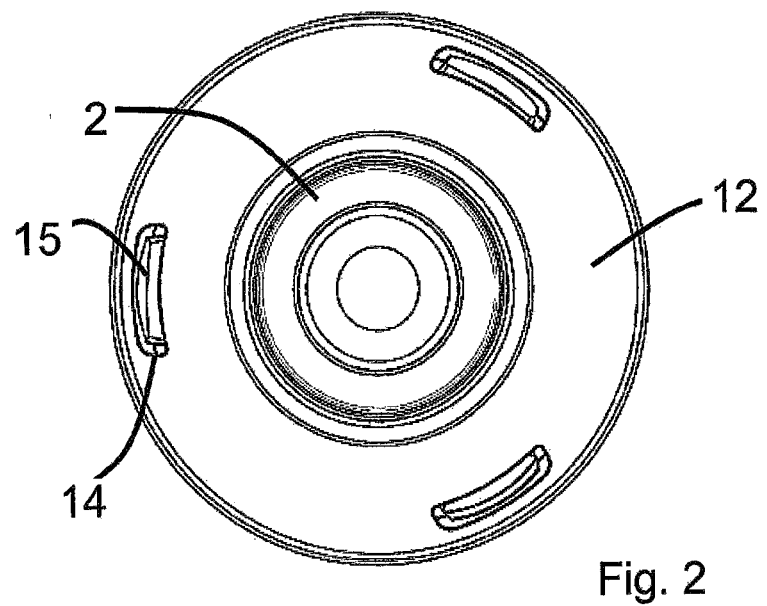
FIG. 2 is a top view of the rear end of the drill chuck of FIG. 1.

FIG. 2 is a top view of the rear end of the first embodiment of the drill chuck 1 according to the invention in FIG. 1. Evident here in particular is the uniform angular distribution of the chip-discharge holes 14 extending axially through the cover disk 12. FIG. 2 also shows that the chip-discharge holes 14 are oriented such relative to the jaws 6 as to enable the particle-conveying bumps 15 to engage in the chip-discharge holes 14 when the jaws 6 are reset from the closed to the open position, thereby allowing drill chips to be forced out of the drill chuck 1 through the chip-discharge holes 14.

Figure 3:
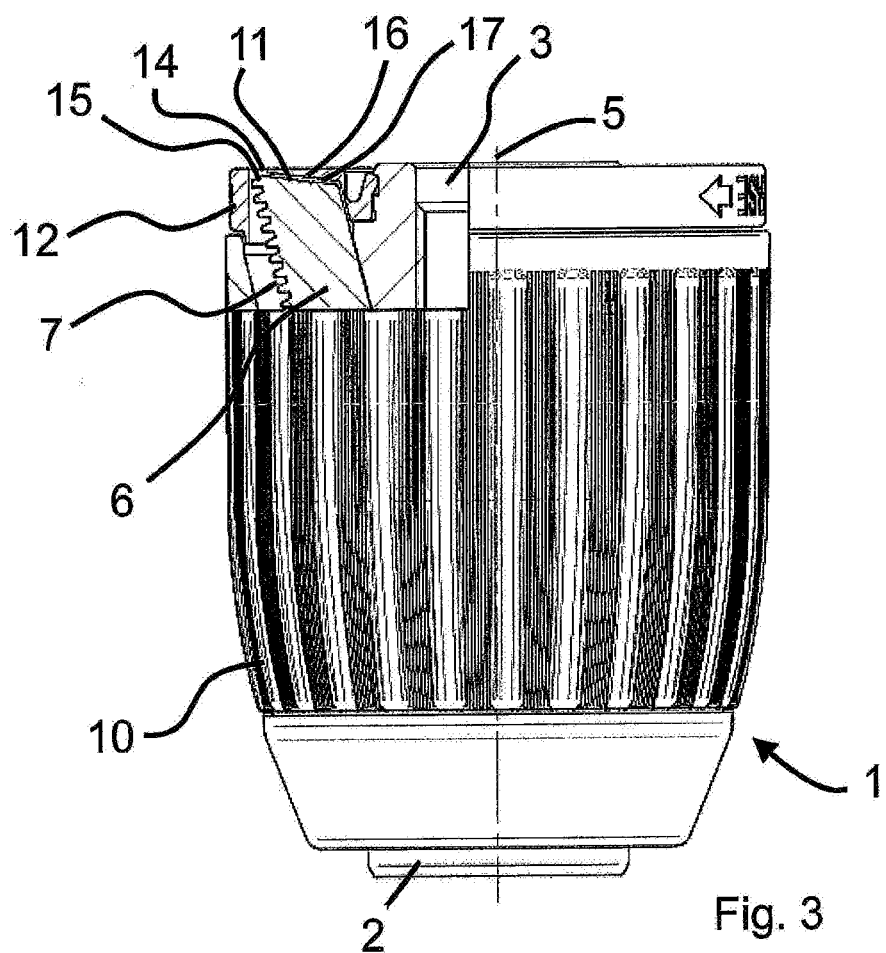
FIG. 3 is a partial section through a second embodiment of the drill chuck according to the invention.

FIG. 3 shows a second embodiment of the drill chuck 1 according to the invention. Forwardly angled particle-conveying surfaces 11 are here formed as planar surfaces extending at an angle α of 5° relative to a plane perpendicular to the chuck axis 5. In analogous fashion to the embodiment shown in FIG. 1, the cover disk 12 also has formations 16 matching the particle-conveying surfaces 11 formed by the planar rear faces 11, thereby creating particle-conveying passages 17.

Figure 4:
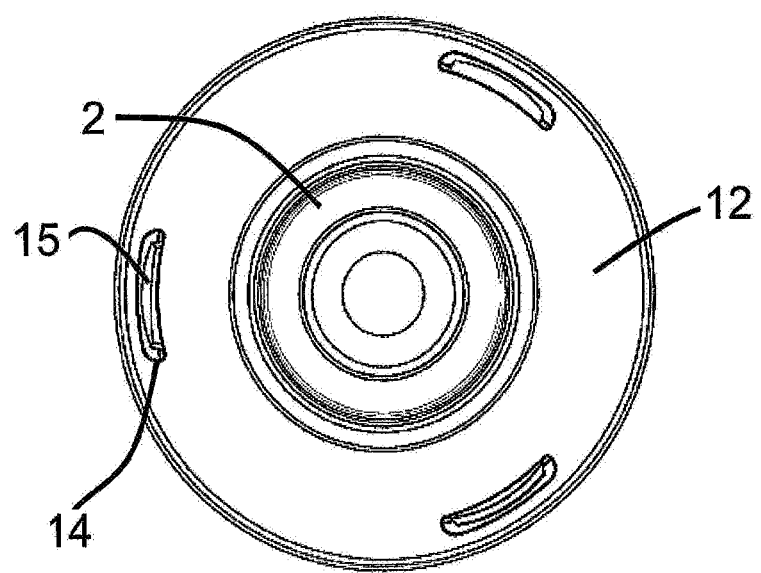
FIG. 4 is a top view of the rear end of the drill chuck of FIG. 3.

As is evident in the top view of FIG. 4 showing the rear end of the drill chuck 1, the chip-discharge holes 14 in the illustrated embodiment also fit with the particle-conveying bumps 15 of the drill chuck 1 according to the invention so as to assist the forcing out of the drill chips from the drill chuck 1 when the jaws 6 are reset from the closed to the open position.

Figure 5:
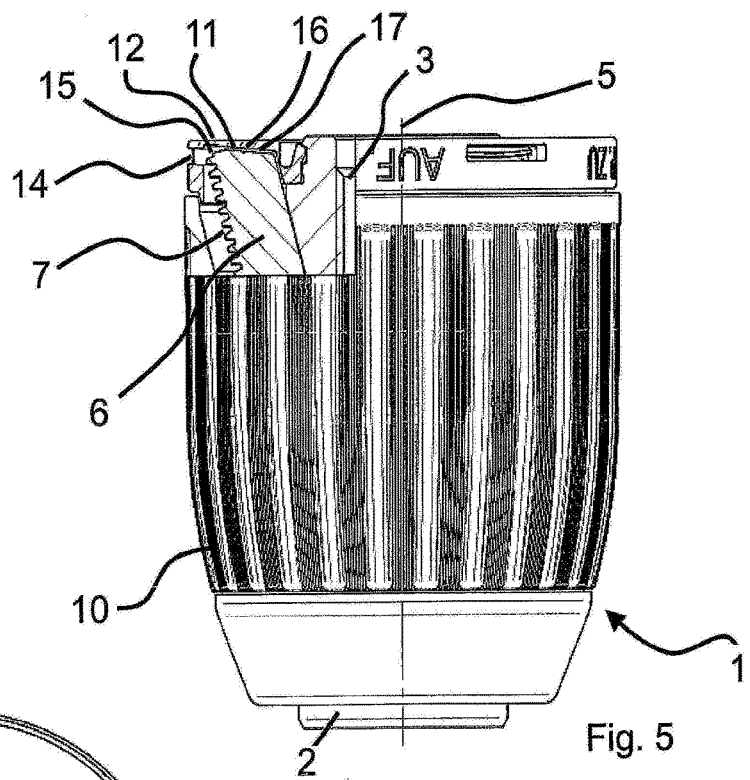
FIG. 5 is a partial section through a third embodiment of the drill chuck according to the invention.
Figure 6:
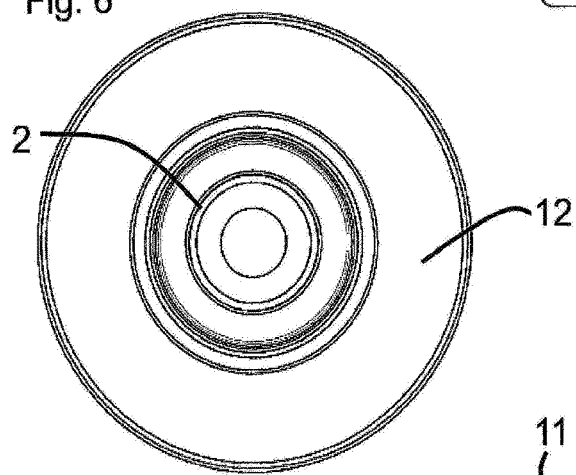
FIG. 6 is a top view of the rear end of the drill chuck of FIG. 5.

FIG. 5 shows a radial orientation of the chip-discharge holes 14 in a third embodiment of the drill chuck 1 according to the invention, that is with the inner ends of the holes 14 opening radially inward and the outer ends opening radially outward. Thus the chip-discharge holes 14 are not visible in the top view of the rear end of the drill chuck 1 of FIG. 6.

We claim:

1. A drill chuck comprising:
   a chuck body extending along an axis and having a rear end formed with a drive-spindle seat and a plurality of angularly spaced and axially extending but angled guide grooves;
   respective jaws axially displaceable in the grooves between an axially front and radially closely spaced closed position and an axially rear and radially less closely spaced open position, each jaw having an inner edge adapted to grip a tool and an outer edge formed with external teeth, each jaw further having an axially rearwardly directed rear face extending at an acute angle to a plane perpendicular to the axis and inclined axially forward from the outer edge toward the inner edge, each jaw being formed on the respective rear face at the respective outer edge with an axially rearwardly projecting bump;

a ring rotatable on the body about the axis and having an internal screwthread meshing with the teeth;

an adjustment sleeve rotationally coupled to the ring and rotatable to move the jaws between the open and closed positions; and a cover disk on the rear end of the body and formed with respective throughgoing chip-discharge holes each having an inner end aligned with a respective one of the grooves and an outwardly open outer end, the bumps being fittable in the inner ends of the respective holes in a fully open position of the jaws such that during drilling chips in the grooves are urged radially outward and axially rearward by centrifugal force and, in the fully open position of the jaws, are pushed by the bumps out through the holes.

2. The drill chuck defined in claim 1, wherein each rear face is substantially planar.

3. The drill chuck defined in claim 1, wherein each rear face is curved.

4. The drill chuck defined in claim 3, wherein each rear face forms with the cover plate in the fully open position an axially rearwardly open and radially extending passage.

5. The drill chuck defined in claim 1, wherein the angle is between 2° and 15°.

6. The drill chuck defined in claim 1, wherein the angle is substantially 5°.

7. The drill chuck defined in claim 1, wherein the inner ends of the chip-discharge holes and the bumps are axially aligned and at the inner edges of the respective jaws.

8. The drill chuck defined in claim 1, wherein the outer ends of the chip-discharge holes open radially outwardly.

9. The drill chuck defined in claim 1, wherein the outer ends of the chip-discharge holes open axially rearwardly.

10. The drill chuck defined in claim 1, wherein the cover disk is shaped to fit complementarily with the rear ends of the rear faces of the jaws in the fully open position to form radially extending but particle-conveying passages inwardly closed by the bumps.

11. The drill chuck defined in claim 1, wherein the inner ends of the chip-discharge holes form in the fully open position rearward continuations of the respective guide grooves.

* * * * *